Patented Mar. 15, 1949

2,464,291

UNITED STATES PATENT OFFICE 2,464,291

STABILIZATION OF ORGANIC COMPOUNDS

Joseph A. Chenicek, Riverside, Ill., assignor to Universal Oil Products Company, Chicago, Ill., a corporation of Delaware No Drawing. Application July 5, 1946, Serial No. 681,589

6 Claims. (Cl. 44—74)

This invention relates to the stabilization of organic compounds which tend to deteriorate in storage or in use due to oxidation reactions.

Various organic compounds, including motor fuel, mineral oil, lubricating oil, drying oil, greases, rubber, etc., are adversely affected by oxygen, with the resultant formation of undesirable gums and usually discoloration of the organic compound, as well as other deleterious reactions.

One object of the present invention is to prevent or at least to retard the undesirable deterioration of organic compounds and particularly of motor fuel.

Another object of the invention is to provide a novel inhibitor which will function to stabilize motor fuels and particularly cracked or polymer gasolines.

Various inhibitors have heretofore been proposed for the stabilization of gasoline and one of the more successful of these inhibitors is N,N'-di-sec-butyl para-phenylene diamine. While this inhibitor is highly satisfactory for the purpose, it does have one or two disadvantages; namely, it tends to crystallize at low temperatures and is not as color stable as desired. N,N'-di-sec-butyl para-phenylene diamine has a melting point of about 18° C., and will solidify if stored at a temperature below this, with the resultant inconvenience to the user of necessitating his heating the drum containing the inhibitor in order that the inhibitor will be fluid and may be pumped for the desired use. Also it generally is necessary with this inhibitor to maintain a gas blanket, usually of nitrogen, over the inhibitor during storage in order to prevent discoloration thereof.

In one embodiment the present invention relates to a method of stabilizing an organic compound against deterioration which comprises incorporating therein an inhibitor comprising the product formed by the reductive alkylation of an aromatic amino compound selected from the group consisting of para-phenylene diamine and para-nitroaniline with an unsaturated ketone.

In a specific embodiment the present invention relates to a method of stabilizing motor fuel which comprises incorporating therein about 0.0001% to about 0.01% of an inhibitor comprising the product formed by the reductive alkylation of para-phenylene diamine with mesityl oxide.

In still another embodiment, the present invention relates to a novel composition of matter comprising the products formed in the manner herein set forth.

The inhibitor of the present invention may be manufactured in any suitable manner. A preferred method of operation is to react para-phenylene diamine or para-nitroaniline with the desired unsaturated ketone in the presence of a suitable catalyst and hydrogen. A particularly preferred catalyst for effecting the desired reaction comprises a mixture of the oxides of chromium, copper and barium, although other suitable catalysts may be employed. In general, the reaction is effected at an elevated temperature of about 100° to about 250° C. under a hydrogen pressure of about 5 to about 200 atmospheres.

Mesityl oxide is the preferred unsaturated ketone to be employed. Other suitable unsaturated ketones include vinyl-methyl-ketone, vinyl-ethyl-ketone, vinyl-propyl-ketone, phorone, methyl heptone, etc., although with the understanding that the resultant compounds are not necessarily equivalent. In general it is preferred to utilize a molar excess of unsaturated ketone over that required to form the N,N'-di-substituted para-phenylene diamine, and the molar ratio of ketone to aromatic amino compound should be in the range of about 2.1 to about 10.1 or more. While it is believed that the product comprises a N,N'-di-substituted para-phenylene diamine in which the substituent group contains an unsaturated linkage, the exact structure of the product has not been determined, and I therefore do not intend to be limited thereto.

Aromatic amino compounds may comprise para-phenylene diamine or para-nitroaniline. It is believed that para-nitroaniline is reduced to para-phenylene diamine during the reductive alkylation reaction and then undergoes the desired reductive alkylation.

The inhibitor of the present invention will usually be added to gasoline in an amount of less than 0.1% by weight and generally will be utilized in the amount of about 0.0001% to about 0.01%. The exact amount of the inhibitor required will depend upon the particular organic compounds being treated and upon the stability desired. These inhibitors may also be employed in connection with various dyes, antiknock agents such as tetraethyl lead, metal deactivators, or other additives employed for specific purposes in the organic compounds.

The following examples are introduced to further illustrate the novelty and utility of the present invention but not with the intention of unduly limiting the same.

Example I

An inhibitor comprising the reaction product of para-phenylene diamine and mesityl oxide was prepared by reacting one mol of para-phenylene diamine with eight mols of mesityl oxide at a temperature of 100° C. under a hydrogen pressure of 60 atmospheres in the presence of a catalyst consisting of 10 $CR_2O_3$:10 CuO:1 BaO.

The inhibitor as prepared in the above manner had a melting point of −13° C. and, when added to Pennsylvania cracked gasoline in an amount of 0.006% by weight, increased the induction period, as determined by the oxygen bomb stability test, from 100 minutes to about 485 minutes.

Example II

For the purpose of comparison, another inhibitor was prepared by the condensation of one mol of para-phenylene diamine with eight mols of methyl isobutyl ketone at substantially the same conditions and with the same catalysts as specified in Example I. This inhibitor had a melting point of 46° C. and an induction period of about 480 minutes.

It will be noted that the inhibitor prepared from the unsaturated ketone had a melting point of −13° C. as compared to a melting point of 46° C. for the inhibitor prepared from the saturated ketone.

I claim as my invention:

1. Cracked gasoline containing a small but effective amount of an inhibitor comprising the product formed by the reductive alkylation of para-phenylene diamine with an aliphatic unsaturated ketone.

2. A cracked gasoline containing from about 0.0001% to about 0.01% by weight of an inhibitor comprising the product formed by the reductive alkylation of para-phenylene diamine with an aliphatic unsaturated ketone.

3. The composition of claim 1 further characterized in that said unsaturated ketone comprises mesityl oxide.

4. The composition of claim 1 further characterized in that said unsaturated ketone comprises phorone.

5. Cracked gasoline tending to deteriorate due to oxygen containing, as an inhibitor for said deterioration, the product formed by the reductive alkylation of an aromatic amino compound selected from the group consisting of para-phenylene diamine and para-nitroaniline with an aliphatic unsaturated ketone.

6. Cracked gasoline tending to deteriorate due to oxygen containing, as an inhibitor for said deterioration, from about 0.0001% to about 0.01% of the product formed by the reductive alkylation of para-phenylene diamine with mesityl oxide.

JOSEPH A. CHENICEK.

REFERENCES CITED

The following references are of record in the file of this patent:

UNITED STATES PATENTS

| Number | Name | Date |
|---|---|---|
| 2,323,948 | Von Bramer | July 13, 1943 |
| 2,381,015 | Von Bramer | Aug. 7, 1945 |